(12) United States Patent
Shmulevich et al.

(10) Patent No.: US 6,515,985 B2
(45) Date of Patent: Feb. 4, 2003

(54) CONVERGENCE OF TELEPHONE SIGNALING, VOICE AND DATA OVER A PACKET-SWITCHED NETWORK

(75) Inventors: Oren T. Shmulevich, Kamat Gan (IS); Ofer Gottfried, Netaim (IS); Vladimir Arbetov, Rishon Lezion (IS); Roie Geron, Tel Aviv (IS); Leonid Durakovsky, Raanana (IS)

(73) Assignee: Airslide Systems Ltd., Herzlia (IL)

( * ) Notice: Subject to any disclaimer, the term of this patent is extended or adjusted under 35 U.S.C. 154(b) by 0 days.

(21) Appl. No.: 09/777,799

(22) Filed: Feb. 6, 2001

(65) Prior Publication Data

US 2001/0036173 A1 Nov. 1, 2001

Related U.S. Application Data

(60) Provisional application No. 60/181,097, filed on Feb. 8, 2000.

(51) Int. Cl.[7] ............... H04L 12/66; H04Q 7/24; H04J 3/12; H04B 1/38; H04M 1/00
(52) U.S. Cl. ............ 370/356; 370/338; 370/522; 455/560
(58) Field of Search ................. 370/352–356, 370/328, 338, 400, 401, 402, 498, 522; 379/219–221, 229, 220.01; 455/414, 417, 550, 560

(56) References Cited

U.S. PATENT DOCUMENTS

| | | | | |
|---|---|---|---|---|
| 5,434,854 A | * | 7/1995 | Focarile et al. | 370/335 |
| 5,594,952 A | | 1/1997 | Virtuoso et al. | 455/557 |
| 5,729,536 A | * | 3/1998 | Doshi et al. | 370/328 |
| 5,809,415 A | | 9/1998 | Rossmann | 455/422 |
| 5,857,153 A | | 1/1999 | Lupien | 455/422 |
| 5,862,491 A | | 1/1999 | Nair et al. | 455/557 |
| 5,884,165 A | | 3/1999 | Uchida et al. | 455/426 |
| 5,901,352 A | | 5/1999 | St. Pierre et al. | 455/426 |
| 5,910,946 A | * | 6/1999 | Csapo | 370/328 |
| 5,923,854 A | | 7/1999 | Bell et al. | 709/243 |
| 5,946,633 A | | 8/1999 | McAlinden | 455/551 |
| 5,970,059 A | * | 10/1999 | Ahopelto et al. | 370/338 |
| 6,034,950 A | * | 3/2000 | Sauer et al. | 370/328 |
| 6,115,754 A | * | 9/2000 | Landgren | 709/249 |
| 6,122,263 A | * | 9/2000 | Dahlin et al. | 370/329 |
| 6,138,022 A | * | 10/2000 | Strawczynski et al. | 455/455 |
| 6,157,843 A | * | 12/2000 | Derango | 455/518 |
| 6,222,829 B1 | * | 4/2001 | Karlsson et al. | 370/329 |
| 6,327,260 B1 | * | 12/2001 | McGrew | 370/217 |
| 2002/0015392 A1 | * | 2/2002 | Musikka et al. | 370/338 |

FOREIGN PATENT DOCUMENTS

| | | | |
|---|---|---|---|
| EP | 664658 | 7/1995 | |
| WO | WO 99/05830 | 2/1999 | ............ H04Q/7/24 |
| WO | WO 99/33319 | 7/1999 | ............ H04Q/7/24 |
| WO | WO 99/57914 | 11/1999 | |

OTHER PUBLICATIONS

Draft–huitema–MGCP–v0rl1–01.txt, Arango, et al., May 9, 1999. (www.ietf.org/internet–drafts/draft–huitema–MGCP–v0r1–01).

Draft–ietf–megaco–protocol–0.8.txt, Rosen, et al., Apr. 2000. (www.ietf.org/internet–drafts/draft–ietf–megaco–protocol–08).

Draft–george–sigtran–m2pa–02.txt, available at draft–ietf–megaco–protocol–08.rtf, 2000.

AS5300 Voice–over–Internet–Protocol (VoIP) gateway, produced by Cisco Systems (san Jose, California), 1999.

RFC: 2960, "Stream Control Transmission Protocol", Stewart, et al. Oct. 2000.

* cited by examiner

Primary Examiner—Kwang Bin Yao
Assistant Examiner—Kevin C. Harper
(74) Attorney, Agent, or Firm—Abelman, Frayne & Schwab

(57) ABSTRACT

Cellular communications apparatus includes a plurality of cellular network switches, each switch adapted to transmit and received signaling messages and media data, and a plurality of gateways. At least one gateway is associated with each of the plurality of network switches. The gateway is coupled to received the signaling messages and media data transmitted by the associated switch and to convey the messages and data together over a common, packet-switched communication link to another of the gateways associated with another one of the network switches.

5 Claims, 9 Drawing Sheets

CONVERGENCE OF TELEPHONE SIGNALING, VOICE AND DATA OVER A PACKET-SWITCHED NETWORK

CROSS-REFERENCE TO RELATED APPLICATION

This application claims the benefit of U.S. Provisional Patent Application No. 60/181,097, filed Feb. 8, 2000, which is incorporated herein by reference.

FIELD OF THE INVENTION

The present invention relates generally to communication systems, and specifically to methods and apparatus for transmission of cellular signaling, voice and other data over packet-switched networks.

BACKGROUND OF THE INVENTION

Existing cellular communication networks are dependent on an infrastructure of circuit-switched wireline trunks. Typically, cellular operators maintain separate trunk networks for signaling, voice and other data. As cellular networks grow, the economic burden on the operators of maintaining or leasing these trunks becomes ever heavier. Communications among switches in a cellular network and between one cellular network and another must generally pass through switching equipment and lines belonging to public switched telephone networks (PSTNs), adding the expense of transfer fees to inter-network calls.

FIG. 1 is a block diagram that schematically illustrates a cellular communications system 20, as is known in the art. The system in this example includes two cellular networks 22 and 24, belonging to respective cellular operators "Cellco 1" and "Cellco 2." The networks are connected to one another through a PSTN 26. A subscriber of network 22 communicates with a base transceiver station (BTS) 36 in the network using a mobile station (MS) 64. Typically, the BTS communicates with and is controlled by a base station controller (BSC) 34. When the user of MS 64 originates a call, appropriate signaling is sent from BTS 36 to BSC 34, and from the BSC to a mobile switching enter (MSC), 32. Typically, the signaling is in accordance with SS7 signaling specifications established by the International Telecommunications Union (ITU-T), as described in the Q.700 series of standards. The signaling to and from the MSCs is indicated in this figure and in other figures in this application by solid lines. Voice and other data communications are indicated by dashed lines.

Assuming that MS 64 initiates a call with another MS in another part of the network, say in communication with a MSC 28, MSC 32 sets up the call by sending a signaling message to a signaling transfer point (STP) 38 or 40. The STP sends the message on to MSC 28. The MSCs exchange messages through the STP in order to set up the call, and maintain this signaling link during the call for purposes of subscriber roaming, inter alia. Once the call is set up, a voice connection between MSC 32 and MSC 28 is established. In the present example, in which there is no direct voice line connecting MSC 28 and MSC 32, a third MSC 30 acts as a "tandem," i.e., a circuit switch for conveying voice signals between the other two MSCs.

When the user of MS 64 wishes to make a call to a subscriber of network 24, MSC 32 must send a signaling message to STP 38 or 40 indicating that such a call is to be set up. The STP then signals an STP 44 or 46 belonging to PSTN 26, which signals an STP 48 or 50 in network 24, which finally signals the appropriate one of MSCs 54, 56 or 58 in network 24. Once the call is set up, MSC 32 transmits a voice stream from MS 64 through a tandem switch 62 in PSTN 26. The tandem switch passes the voice on to the appropriate MSC in network 24. In other words, the signaling and voice carried between networks 22 and 2 must pass through separate circuit switches (STPs and tandems) of PSTN 26, with charges levied by the PSTN for both.

A further feature of many cellular networks is a short message service (SMS), provided by a SMS center 42 or 52. The SMS enables network subscribers to send data messages to other subscribers. These data messages are normally carried over the signaling (solid) lines in the cellular network. The popularity of SMS is creating a growing burden on the cellular signaling infrastructure.

Generally speaking, because cellular networks have been developed primarily for circuit-switched transmission, they are not well suited for packet-switched data. For this reason, the European Telecommunications Standards Institute (ETSI) has proposed a general packet data service (GPRS) to operate in conjunction with Global System for Mobile (GSM) cellular networks. When a MS in a GSM network with GPRS wishes to send and/or receive packet-switched data, the MS makes contact with a "serving GPRS support node" (SGSN not shown in the figures) through the BSC with which the MS is in communication. The packet data are transmitted and received by the BSC through the SGSN, separately from the voice channels that go through the MSC. The SGSN is connected to a packet data network, such as the internet, rather than to the existing cellular and PSTN infrastructure. The SGSN likewise maintains its own separate mobility management and security facilities. Implementation of GPRS requires a substantial investment in new network infrastructure, and users must have suitable, GPRS-compatible MSs. The GPRS can also be used to carry SMS messages by "tunneling" over the packet data network.

Solutions are becoming available for enabling MSCs to exchange voice, as well as data, over packet-switched links, in place of the circuit-switched links in traditional cellular networks. For this purpose, a packet gateway, such as the AS5300 Voice-over-internet-Protocol (VoiP) gateway, produced by Cisco Systems (San Jose, Calif.), can be coupled to the MSC voice output. Signaling, however, is still conveyed over existing circuit-switched lines. In order to set up a new call, the MSC signals one or the STPs, just as described above with reference to system 20. The signals are then sent to the packet gateway, in order to control transmission of packet data to a corresponding gateway at another MSC that receives the call. While enabling communications between MSCs to be routed over packet-switched links, this solution greatly complicates the cellular signaling network.

As an enhancement to this concept, a central signaling gateway is added at the STP to receive the signals sent by the MSC. An example of a signaling gateway of this sort is the Signaling Gateway USP, produced by Nortel Networks (Saint John, New Brunswick). The signaling gateway invokes a media gateway controller to take over the function of call set-up from the MSC, which is normally responsible for this function in conventional cellular systems. During call setup, the media gateway controller directs a media gateway at the MSC site, such as the above-mentioned AS5300 device, to set up connections over a packet-switched link to the media gateway at the receiving MSC site.

SUMMARY OF THE INVENTION

It is an object of the present invention to provide improved apparatus and methods for conveying communications signaling, and particularly cellular and other SS7 -based signaling over packet-switched networks.

It is a further object of some aspects of the present invention to provide apparatus and methods for convergence of cellular signaling, voice and data over a common network, in particular a packet-switched network.

It is yet a further object of some aspects of the present invention to enable existing cellular equipment, particularly existing MSCs, to convey signaling over packet-switched links while minimizing the changes required in the cellular equipment for this purpose.

In preferred embodiments of the present invention, an integrated packet-switching gateway is coupled to a cellular network switch, typically to a MSC. The switch is normally adapted and programmed, in the absence of the gateway, to communicate with other switches in the cellular network over circuit-switched links, as is known in the art. The integrated gateway, however, converts the signaling, voice and other data output by the switch to packets, and routes the packets over a common packet-switched network to other switches in the cellular network. Similarly, the gateway receives packets sent from other switches over the packet-switched network and passes them to the appropriate inputs of the cellular network switch, which sends and receives signaling, voice and other data through the gateway as though it were communicating over a standard, circuit-switched link.

By providing convergence of the signaling, voice and other data over a common packet-switched network, the integrated gateway simplifies and reduces the costs of communications among the cellular network switches. Vis a vis the switch, however, the gateway emulates the circuit-switched links of the conventional cellular network, so that this convergence is achieved substantially without modification to the existing cellular infrastructure. The packet-switched links established between the gateways of the present invention are preferably used both for communications between switches within a given cellular network and for communications between one cellular network and another. The use of these gateways thus enhances the scalability of the cellular network and reduces the costs to cellular operators of wireline infrastructure and transmission through PSTN switches, allowing the cellular network instead to use lower-cost packet network infrastructure.

Preferably, the integrated packet-switching gateway comprises a control unit and a media gateway unit. The control unit performs the functions of a signaling gateway and of a media gateway controller. As noted above, in preferred embodiments of the present invention, the entire integrated gateway is located at the site of the cellular network switch and works closely in conjunction with the switch itself, unlike signaling gateways known in the art. Control of call connections is thus maintained at the MSC level, avoiding the added complication of transferring this function to a centralized media gateway controller. The local control unit also performs the function of media gateway control. Alternatively, the control unit by itself (without a media gateway) is used at the cellular network STPs to provide packet-switched links with other STPs and with the MSCs in the network. The gateway also preferably comprises a router, most preferably an Internet Protocol (IP) router, which receives both the signaling packets from the control unit and the voice and other data packets from the media gateway unit and routes them over the packet-switched network to the appropriate target gateway.

As noted. above, the packet-switching gateway of the present invention handles both signaling and voice, as well as other data communications. All of these communication types are passed through the packet-switched network in the form of packets, regardless of their contents. Therefore, in the context of the present patent application and in the claims, the term "packet" is to be understood as referring to signaling, voice and/or data packets, unless otherwise specified. Furthermore, the terms "media" and "data" are to be understood generally as including voice and other audio data, in addition to other types of data and media generated in communications between computers or other data devices.

There is therefore provided, in accordance with a preferred embodiment of the present invention, gateway apparatus for coupling a cellular switching center to a packet-switched network, including:

a control unit, adapted to receive upstream signaling messages from the cellular switching center destined for a cellular signaling transfer point or for another cellular switching center and to packetize the messages for transmission over the packet-switched network; and a media gateway unit, adapted to receive from the cellular switching center upstream media data and to packetize the media data for transmission over the packet-switched network.

Preferably, the media data include voice signals. Alternatively or additionally, the media data are generated by a computer in communication with the cellular switching center.

Preferably, the media gateway unit and the control unit are located at a site of the cellular switching center from which they respectively receive the media data and the signaling messages. further preferably, the control unit is further adapted to receive message packets from the packet-switched network and to generate, responsive to the message packets, downstream signaling messages for delivery to the cellular switching center.

In a preferred embodiment, the control unit and the media gateway unit are adapted to packetize the signaling messages and the media data, respectively, in accordance with the Internet Protocol (IP). Preferably, the apparatus includes an ID router, which is coupled to route the packetized messages and data over the network. Further preferably, the control unit is adapted to extract routing information from the signaling messages received from the cellular switching center and to determine an IP address to which to send the packetized messages based on the routing information. Most preferably, the routine information includes Message Transfer Part (MTP) 3 and/or Signaling Connection Control Part (SCCP)/Global Title Translation (GTT) information. Additionally or alternatively, the packet-switched network includes a local area network (LAN) linking the control unit and the media gateway unit. Preferably, the control unit includes a media gateway controller, which is coupled to control the media gateway unit via the LAN. Further additionally or alternatively, the packet-switched network includes a wide-area network (WAN), coupled to the LAN so as to enable the cellular switching equipment to communicate via the WAN with other cellular switching equipment, with a router that is configured to couple the WAN to the LAN.

Preferably, the control unit is configured to emulate circuit-switched signaling communications between the cellular switching center and other elements of a cellular network. Typically, the cellular switching center includes a mobile switching center (MSC), and the control unit is configured to emulate the signaling communications between the MSC and the signaling transfer point in the cellular network. Alternatively or additionally, the control unit may be configured to emulate a Home Subscriber Service (HSS), a Home Location Register (HLR), a Service Control Point (SCP), an Equipment Identity Register (EIR), and/or a Short Message Service (SMS) center. In a preferred embodiment, the control unit is adapted to select for packetizing certain of the signaling messages that are to be transmitted over the packet-switched network, while other signaling messages are transmitted by the cellular switching equipmen: over a circuit-switched link.

Preferably, the signaling gateway is adapted to receive the signaling messages in accordance with a predetermined call control protocol of the cellular network and to pass the messages over the packet-switched network substantially without termination of the call control protocol. Most preferably, the control unit is further adapted to track or monitor a state of a call placed by the cellular switching center without termination of call-related and trunk maintenance signaling, and to control the Media Gateway. Additionally or alternatively, the control unit is adapted to read a destination field in the signaling messages and to transmit the messages to a destination address on the packet-switched network corresponding to the destination field. Most preferably, the signaling protocol includes a SS7 protocol, and wherein the destination field includes a destination point code. Additionally or alternatively, he control unit is further adapted to track or monitor a state of a call placed by the cellular switching center, and to control the media gateway unit responsive to the state of the call.

Preferably, the packet-switched network couples the cellular switching center, via the gateway apparatus, with other cellular switching equipment within a common network. Additionally or alternatively, the cellular switching center belongs to a first cellular network, and wherein the packet-switched network couples the cellular switching equipment, via the gateway apparatus, with cellular switching equipment in a second cellular network.

In a preferred embodiment, the control unit is further coupled to receive data messages from a cellular short message service (SMS) and to packetize the data messages for transmission over the packet-switched network.

In other preferred embodiments, the control unit is further coupled to receive data messages from a cellular Home Location Register (HLR), a cellular Equipment Identity Register (EIR), a Service Control Point (SCP), and/or a cellular third generation (3G) Home Subscriber Server (HSS), and to packetize the data messages for transmission over the packet-switched network.

There is also provided, in accordance with a preferred embodiment of the present invention, cellular communications apparatus, including:

a plurality of cellular network switches, each switch adapted to transmit and receive signaling messages and media data; and plurality of integrated gateways, at least one such gateway associated with each of the plurality of network switches and coupled to receive the signaling messages and media data transmitted by the associated switch adapted to convey the messages and data together over a common stream or link to another of the gateways associated with another one of the network switches.

Preferably, the common communication link is part of a packet-switched communication network. Most preferably, the gateways are adapted to packetize the signaling messages and media data for conveyance over the packet-switched communication network in accordance with the Internet Protocol (IP). Preferably, the cellular network switches are configured to communicate, in the absence of the gateways, over connections in a circuit-switched network, and the integrated gateways are configured to emulate circuit-switched communications with the associated cellular network switches. Further preferably, the integrated gateways share a common address in the circuit-switched network. Most preferably, the switches are configured to transmit the signaling messages in accordance with a SS7 signaling protocol, wherein the plurality of integrated gateways have a common SS7 point code.

In a preferred embodiment, the apparatus includes a signaling transfer point (STP) and a signaling gateway associated with the STP, which is configured to exchange signaling messages over the common communication link with the gateway associated with the at least one MSC.

There is additionally provided, in accordance with a preferred embodiment of the present invention, a method for coupling cellular switching equipment to a packet-switched network, including:

receiving upstream signaling messages and upstream media data from the cellular switching equipment; and packetizing the messages and the data for transmission over a common stream or link in the packet-switched network.

Preferably, packetizing the media data includes controlling a media gateway which packetizes the media data in accordance with information derived from the upstream signaling messages. Most Preferably, controlling the media gateway includes monitoring a state of a call in accordance with a SS7 ISDN User Part (ISUP) protocol, and controlling the media gateway responsive to the monitored state.

Further preferably, receiving the signaling messages and the media data includes mimicking circuit-switched signaling communications between the cellular switching equipment and other elements of a cellular network. Most preferably, the cellular switching equipment comprises a mobile switching center (MSC), and mimicking the circuit-switched signaling communications includes mimicking signaling communications between the MSC and a signaling transfer point (STP) in the cellular network or between the MSC and another MSC in the cellular network, wherein packetizing the messages includes sending the messages over the packet-switched network from a first integrated gateway to a second integrated gateway, both gateways having a common point code in the cellular network.

The present invention will be more fully understood from the following detailed description of the preferred embodiments thereof, taken together with the drawings in which:

DETAILED DESCRIPTION OF PREFERRED EMBODIMENTS

Figure 1:
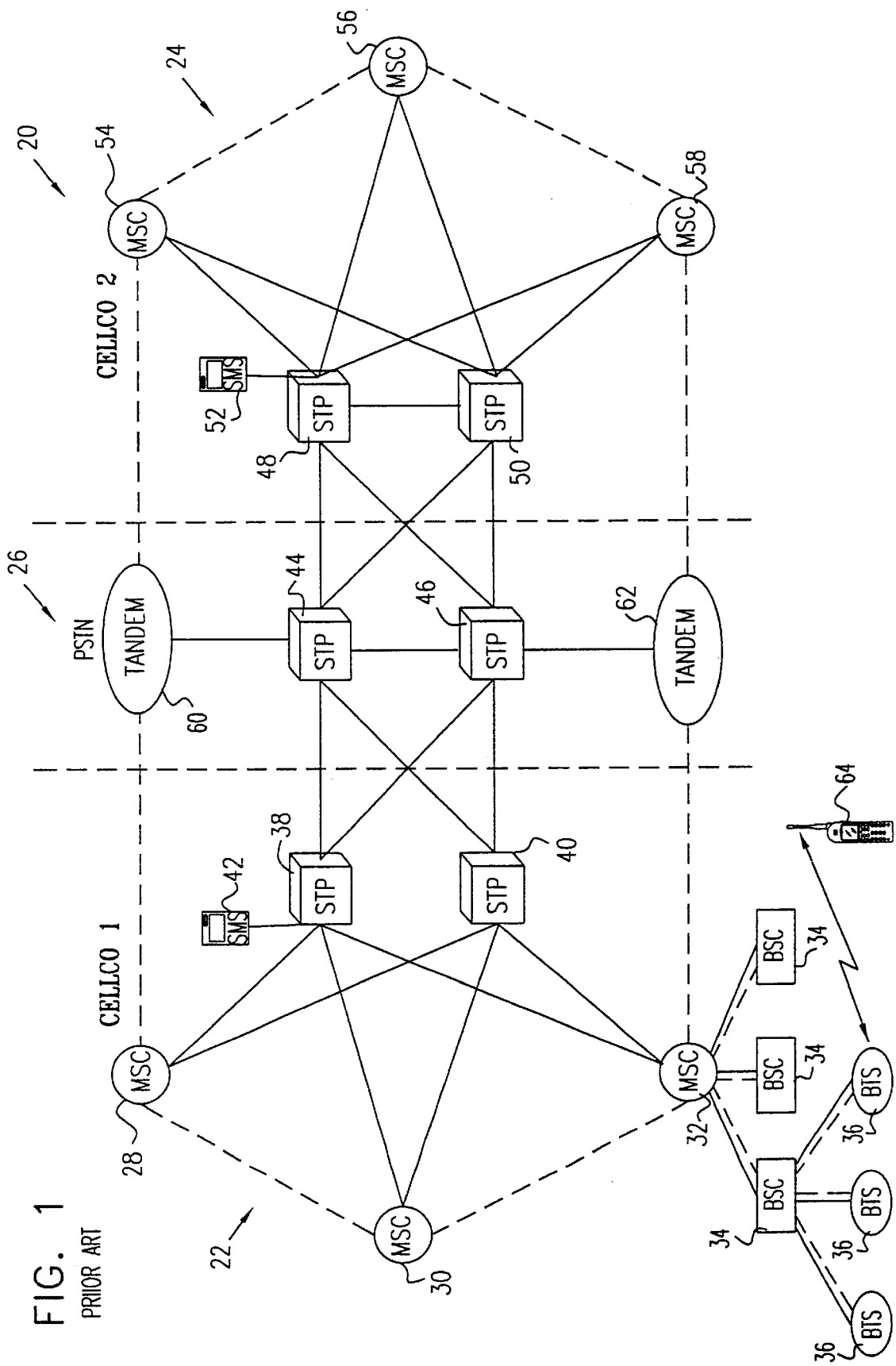
FIG. 1 is a block diagram that schematically illustrates a cellular communication system, as is known in the art.
Figure 2:
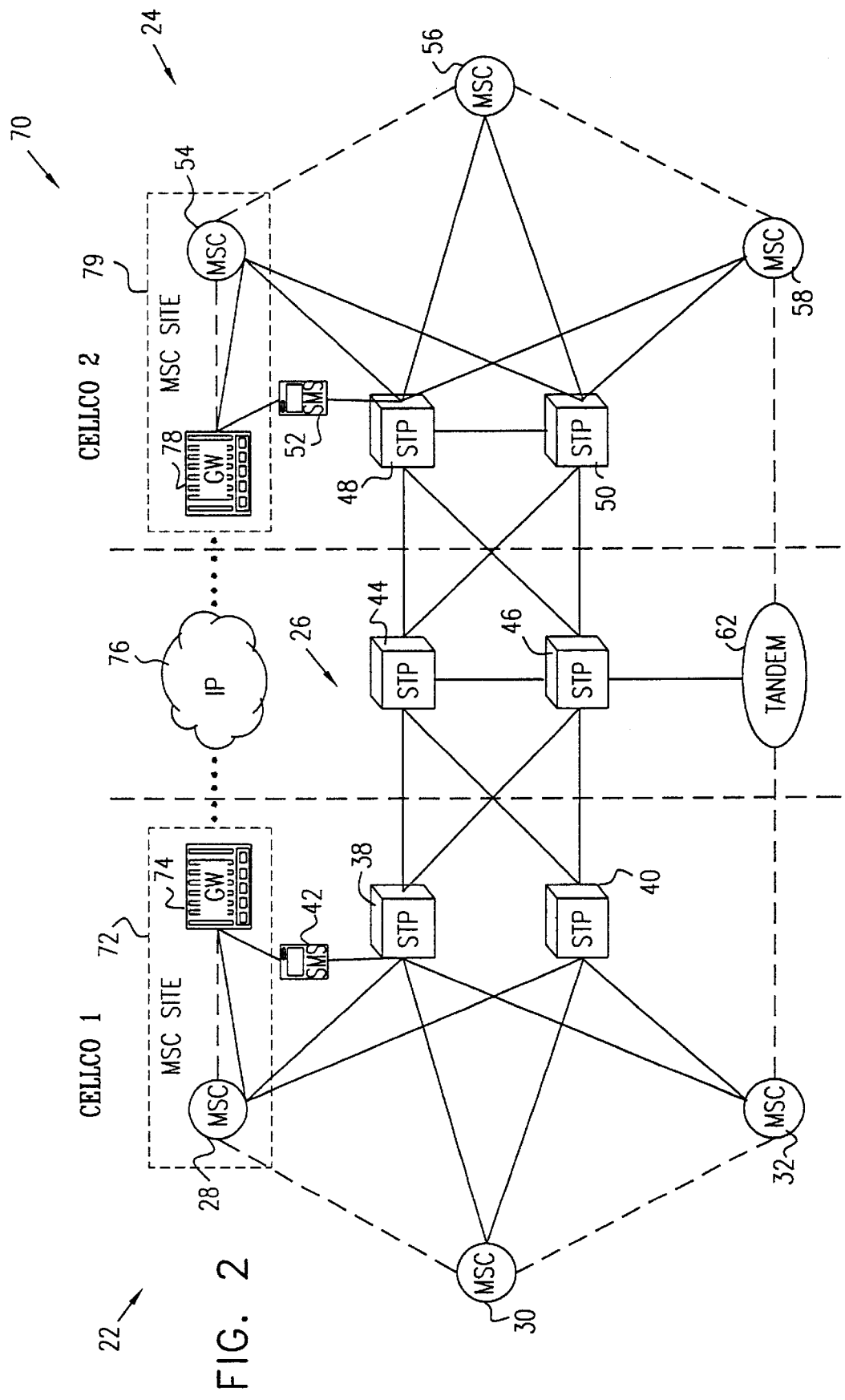
FIG. 2 is a block diagram that schematically illustrates communications between two cellular networks over a packet-switched link, in accordance with a preferred embodiment of the present invention.

Reference is now made to FIG. 2, which is a block diagram that schematically illustrates a cellular communications system 70, in accordance with a preferred embodiment of the present Invention. System 70 is similar to system 20, shown in FIG. 1, and only the elements of system 70 that differ from those in system 20 are described hereinbelow. An Integrated packet-switching gateway 74 is installed at a MSC site 72, in communication with MSC 28 of cellular network 22. A similar integrated gateway 78 is installed at a MSC site 79, in communication with MSC 54 of network 24. Gateways 74 and 78 communicate with one another via a packet-switched network 76, preferably an IP network, rather than through the facilities of PSTN 26 as in FIG. 1.

Integrated gateway 74 is connected to receive both signaling and data (including voice) from MSC 28. Gateway 78 is likewise connected to MSC 54. Optionally, gateways 74 and 78 are connected to respective SMS centers 42. and 52, as described further hereinbelow. As in FIG. 1, the signaling is indicated by a solid line, and the data by a dashed line. Typically, the signaling s in accordance with the above-mentioned SS7 cellular signaling specifications. Packet-switched links are indicated in this and the subsequent figures by dotted lines.

When gateway 74 receives signaling from MSC 28 indicative of a connection to be established with MSC 54 (in response to a request by a subscriber of network 22 to make a call to a subscriber of network 24, for example), the gateway converts the signaling to packet form and transmits it over network 76 to gateway 78. This type of signaling is typically prescribed by the ISDN User Part (ISUP) of SS7. Upon receiving the signaling packets from gateway 74, gateway 78 converts the packets back to the SS7 signaling format that MSC 54 expects to receive. The gateways thus emulate the circuit-switched connections over which the MSCs have been designed to operate, and substantially no modification is required to the MSCs in order to communicate over network 76. In this manner, the connection between MSCs 28 and 54 is established through network 76.

Once the connection is set up, media received by the MSCs from the subscribers are also converted to packet form by the respective gateways and are transmitted over network 76, as well. Both media and signaling packets are conveyed over the same packet-switched network connections, including roaming signaling generated during the call. Each packet is converted by the receiving gateway into the appropriate cellular formal and is conveyed by the gateway to the appropriate input of the respective MSC.

Optionally, the gateways also serve as tandems for the other MSCs in networks 22 and 24. Thus, for example, when MSC 30 (which does not have a packet-switching gateway in this embodiment) places a call to one of the MSCs in network 24, the voice link between the networks can pass through MSC 28, gateway 74 and packet-switching network 76, rather than through a tandem 60 as in FIG. 1. As a further option, gateway 74 may be linked to SMS center 42, so that SMS messages between networks 22 and 24 are carried over packet-switching network 76, rather than through the signaling infrastructure of the cellular networks and of PSTN 26. This type of signaling, having to do with mobile applications of the cellular network, is typically in accordance with the Transaction-Capable Application Protocol (TCAP) of the SS7 standard.

Figure 3A:
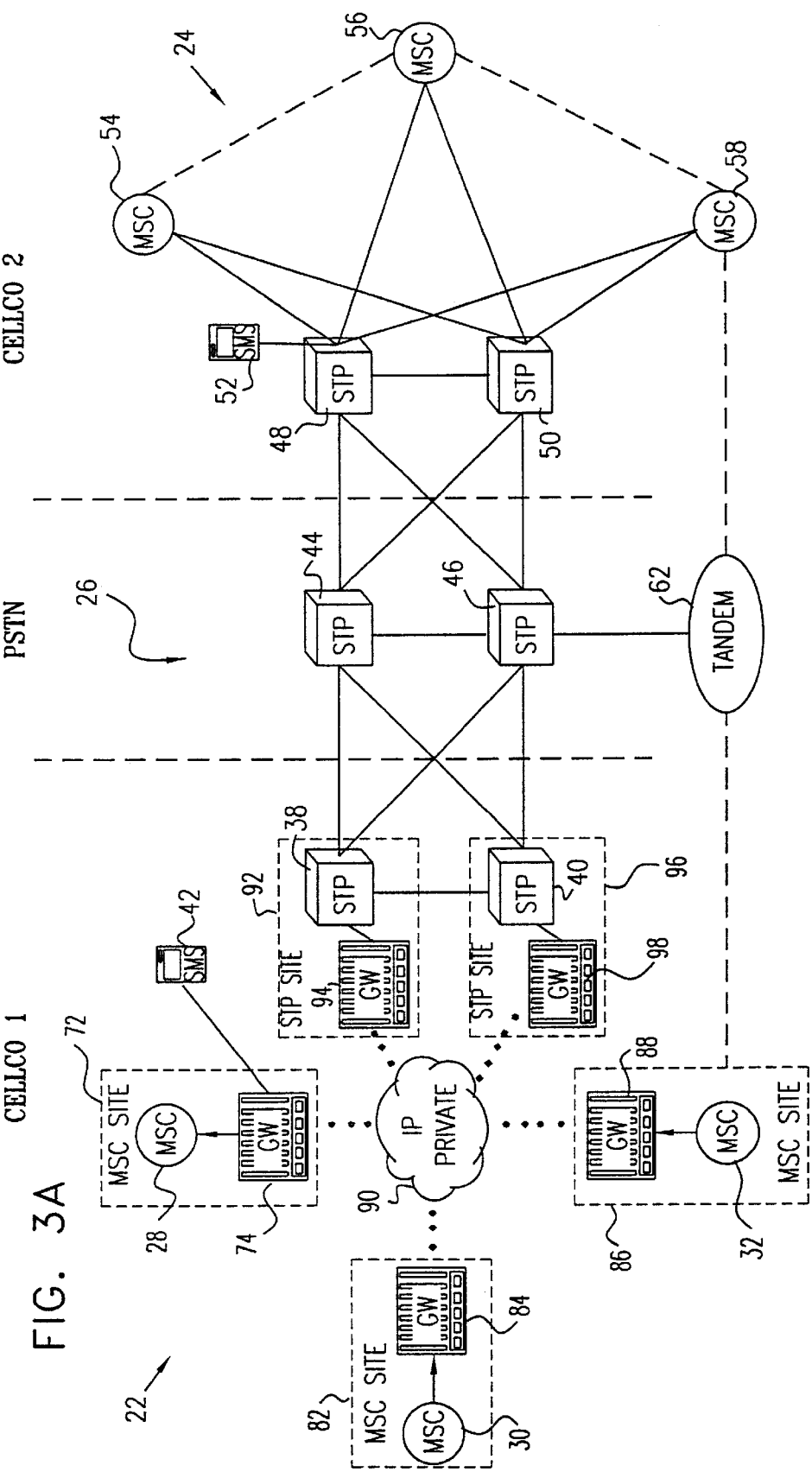
FIGS. 3A and 3B are block diagrams that schematically illustrates communications among switches in a cellular network over packet-switched links, in accordance with a preferred embodiment of the present Invention.

FIG. 3A is a block diagram that schematically illustrates a cellular communications system 80, in accordance with another Preferred embodiment of the present invention. In system 80, the circuit-switched infrastructure of cellular network 22 is replaced by a packet-switched network 90, preferably a private IP network belonging to network 22. In addition to gateway 74 at site 72, as in FIG. 2, MSC 30 is connected to a packet-switching gateway 84 at its site 82, and MSC 32 is connected to a packet-switching gateway 88 at its site 86. In order to communicate with the MSCs, STP 38 is connected to a signaling gateway 94 at its site 92, and STP 40 is similarly connected to a signaling gateway 98 at its site 96. Signaling gateways 94 and 98 process and convey signaling to and from the respective STPs in substantially the same manner as do gateways 74, 84 and 88 in connection with the MSCs. There is no need for gateways 94 and 98 to deal with media, such as voice, however. Gateway 74 also serves as a SMS gateway, to carry SMS messages between SMS center 42 and the switches in cellular network 22 via packet-switched network 90.

Gateways 74, 84 and 86 carry all of the signaling and media traffic between the MSCs in network 22. On the other. hand, links between network 22 and network 24 are still made in the conventional way. In order for MSC 28 to set up a connection to MSC 54, for example, MSC 28 signals STP 38, via respective gateways 74 and 94. STP 38 then establishes the signaling link through STPs 44 and 48. Once the connection is set up, MSC 28 sends voice or other data to MSC 32 via gateways 74 and 88. MSC 32 in this case acts as a tandem, along with tandem switch 62 and MSCs 58 and 56, to pass the voice and/or other data to and from MSC 54. Within network 22, tandem resources are conserved, since all connections between MSCs go through network 90. Thus, MSCs 28 and 32 can communicate directly, rather than having to use MSC 30 as a tandem as in system 20 (FIG. 1) or 70 (FIG. 2), for example.

Figure 3B:
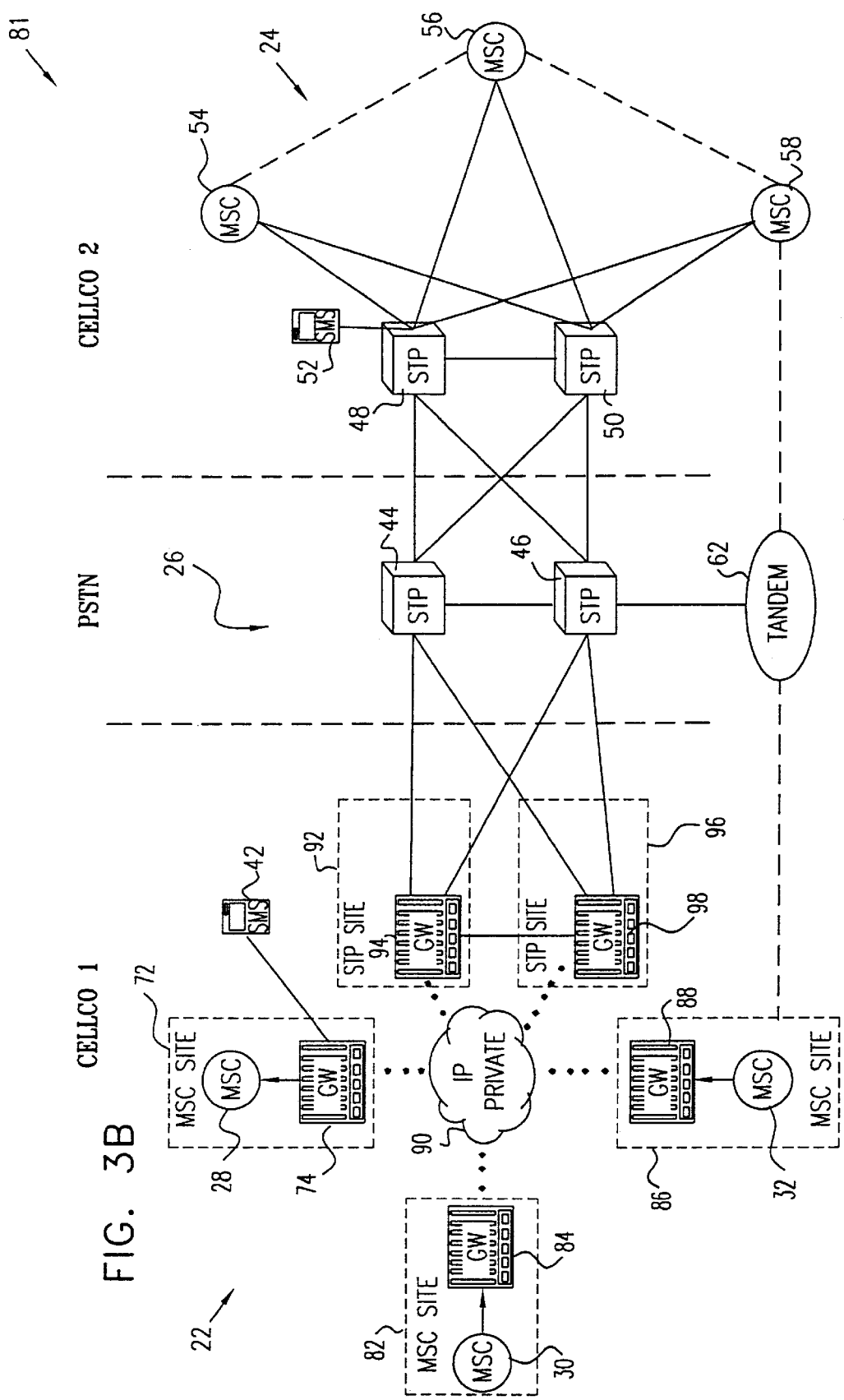

FIG. 3B is a block diagram that schematically illustrates a cellular communications system 81, in accordance with still another preferred embodiment of the present invention. System 81 is substantially similar to system 80, shown in FIG. 3A, except that STPs 38 and 40 are absent in system 81. Instead, gateways 94 and 98 are configured to take full responsibility for the external connections between network 22 and signaling points in another network, such as STPs 44 and 46 in PSTN 26.

Figure 4:
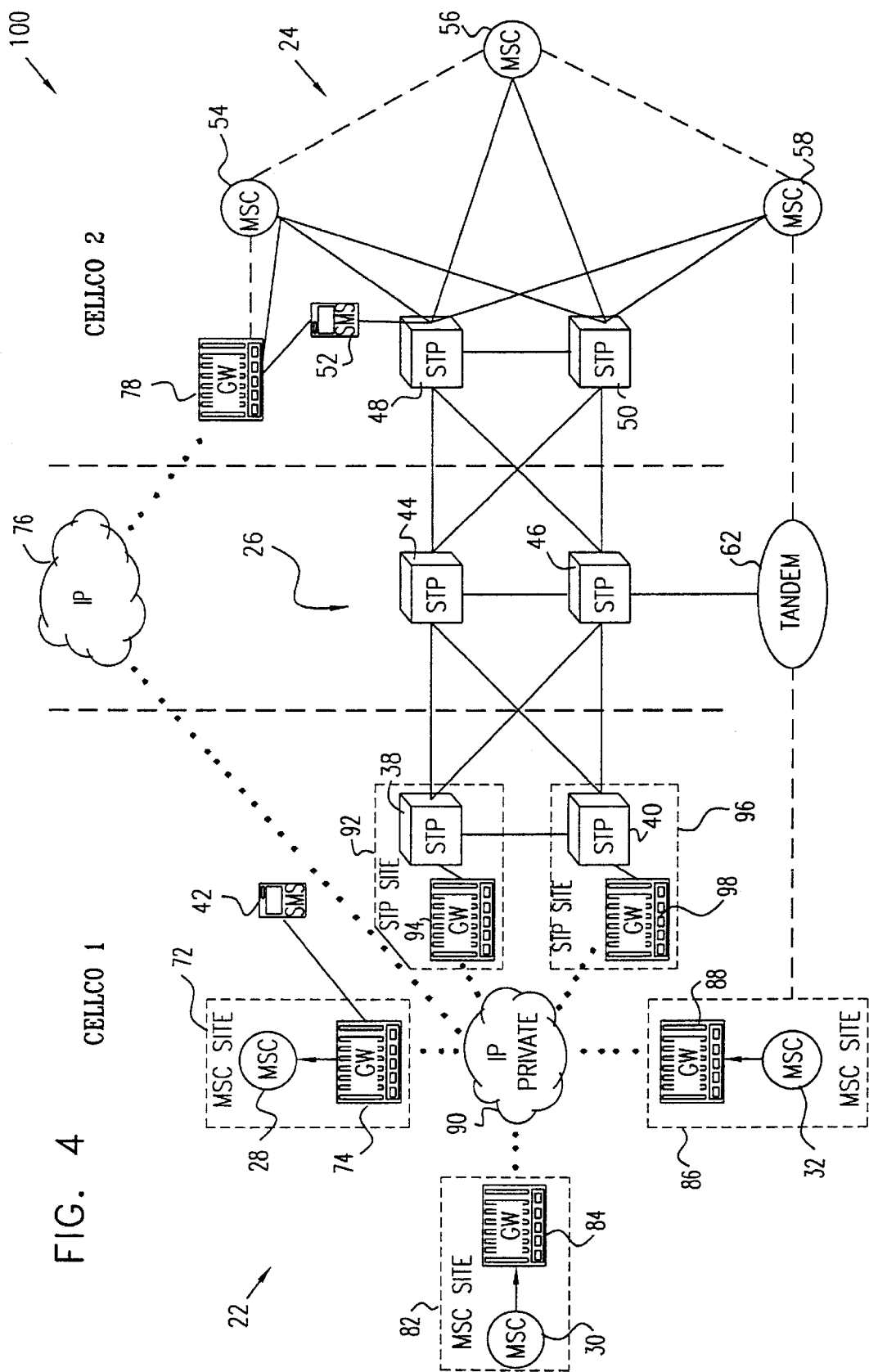
FIG. 4 is a block diagram that schematically illustrates an integrated system for packet-.switched communications among switches within a cellular network and between two cellular networks, in accordance with a preferred embodiment of the present invention.

FIG. 4 is a block diagram that schematically illustrates a cellular communications system 100, in accordance with yet another preferred embodiment of the present invention. This embodiment combines features of the embodiments of FIGS. 2 and 3. Here the switches within cellular network 22 communicate via private packet-switched network 90, while at least some of the communications between cellular networks 22 and 24 are carried over packet-switched network 76. In the embodiment shown in this figure, the circuit-switched link between the cellular networks is still maintained, as well, through PSTN 26. Ultimately, however, network 24 may be converted to a "pure" packet-switched system, like network 22, and all communications between the two cellular networks may take place over packet-switched links.

Figure 5:
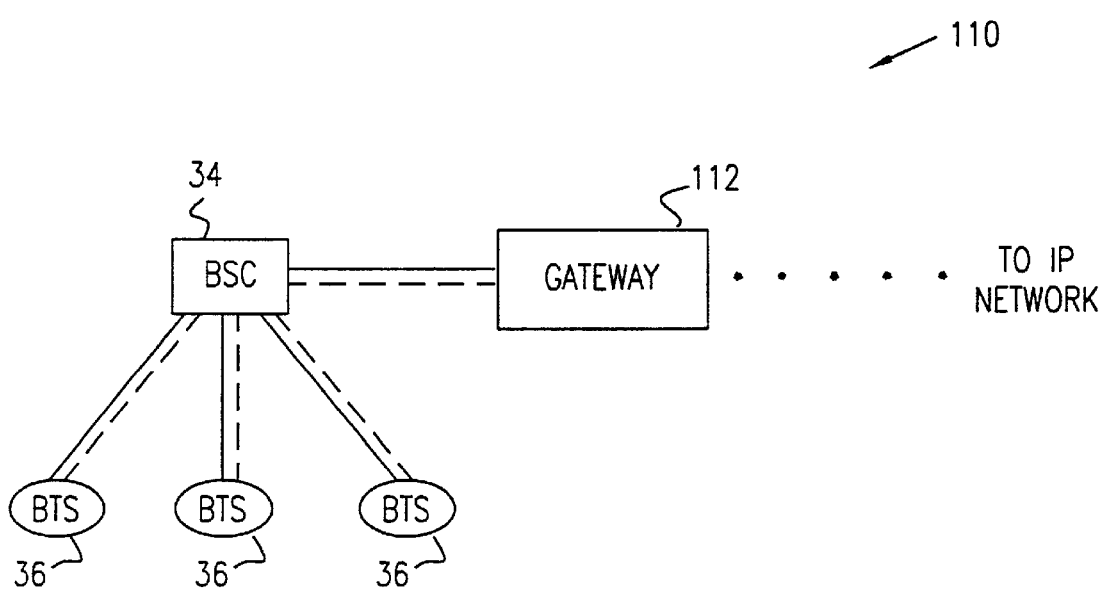
FIG. 5 is a block diagram that schematically illustrates a packet-switching gateway in communication with a base station subsystem in a cellular network, in accordance with a preferred embodiment of the present invention.

FIG. 5 is a block diagram showing elements of another cellular communications system 110, in accordance with a preferred embodiment of the present invention. In this embodiment, convergence of cellular signal and media over a packet-switched network is achieved at the level of the base station subsystem. Here a packet-switching gateway 112 is connected to BSC 34, in place of MSC 32 (as shown in FIG. 1). Gateway 112 emulates the standard signaling and media interfaces between the BSC and the MSC. The gateway thus allows the BSC to communicate with its MSC or with other elements of the cellular network over packet-switched connections, rather than over dedicated, point-to-point lines as in currently-deployed cellular networks.

Figure 6:
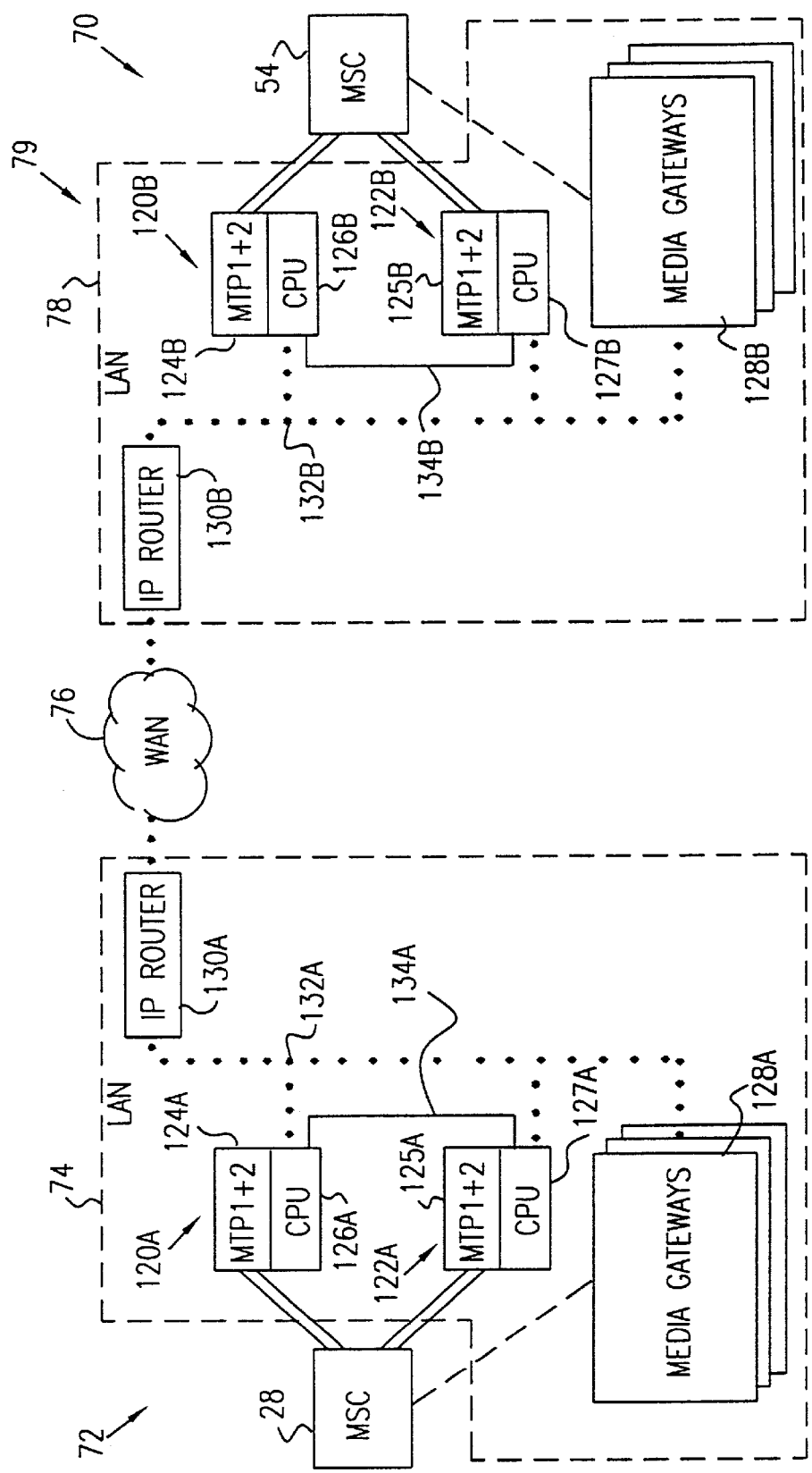
FIG. 6 is a block diagram that schematically shows details of packet-switching gateways linked together to provide communications between cellular MSCs, in accordance with a preferred embodiment of the present invention.

FIG. 6 is a block diagram that schematically illustrates details of gateways 74 and 78, in accordance with a preferred embodiment of the present invention. As the two gateways are substantially identical, the description hereinbelow applies to both of them. For clarity of description, however, elements of gateway 74 are identified by reference numbers with a suffix "a", while elements of gateway 78 have a suffix "b". Each gateway comprises media gateway units 128 and dual control units 120 and 122 (i.e., control units 120a, 122a and media gateway units 128a in gateway 74, and control units 120b, 122b and media gateway units 128b in gateway 78). Each control unit normally acts as both a signaling gateway and as a media gateway controller for its associated media gateway unit. The media gateway units and control units of each gateway are connected to the respective MSC by standard, circuit-switched links, typically over E1, T1 or J1 lines. On the other side, control and media gateway units 120, 122 and 128 exchange data packets with a packet router 130 and with one another over a local-area network (LAN) 132, preferably an Ethernet 10BaseT or 100BaseT LAN. The router, preferably an IP router, of any suitable type known in the art, transmits and receives packets over packet-switched network 76, referred to hereinbelow as a wde-area network (WAN)

Each of control units 120a and 120b comprises a respective interface unit 124a, 124b and central processing unit (CPU) 126a, 126b. Similarly, each of control units 122a and 122b comprises a respective interface unit 125a, 125b and central processing unit (CPU) 127a, 127b. All of the interface units are substantially similar to one another, as are all of the CPUs. Therefore, for the sake of simplicity, the description that follows relates generically to interface unit 124 and CPU 126.

Interface unit 124 is responsible for protocol layers 1 and 2 (the physical layer and transmission layer) of the Message Transfer Part (MTP) of SS7 cellular signaling. CPU 126 is responsible for the higher protocol layers and for conversion of signaling messages between SS7 and packet form, as well as for system control functions. Details of units 124 and 126 and their functions are described below with reference to FIGS. 7 and 8. The dual control units 120 and 122 share the load of signaling that is received from and conveyed to MSC 28. In case of a failure in one of units 120 or 122, however, the other unit senses the failure using a protection link 134 (C-link) and takes over all signaling responsibilities.

As noted above, MSC 28 communicates with control gateways 120a and 122a using SS7 signaling as though the gateways were conventional STPs. In the same way, MSC 54 communicates with respective control gateways 120b and 122b. Preferably, control units 120a and 120b on both sides of the network, as well as the control units of other gateways in the SS7-over-packet system, have the same SS7 point code, so that they appear to the MSCs as though they constitute a single, "distributed" STP. Most preferably, in the redundant configuration of FIG. 6, control units 122a and 122b likewise share a common point code (different from that of units 120a and 120b), so that there are in effect two such distributed STPs available to the MSCs. These SS7 point codes, shared by the different gateways in the system, are referred to herein as "External Point Codes."

Among themselves, however, control units 120a and 120b, and similarly units 122a and 122b, must have distinct point codes in order to carry messages between the MSCs. For this purpose, a virtual network node, with a distinct "Internal Point Code," is assigned to each of the control units. The Internal Point Code is transparent to the SS7 network. Preferably, the IP address of each of the control units is used as its Internal Point Code. In a simplified embodiment, processing of SS7 messages by the control units is then given by the following pseudocode:

On the transmitting side-
if (OPC==External_PC) OPC=Internal_PC
if (OPC==Mate_External_PC) OPC=Mate_Internal_PC
On the receiving side-
if (DPC==internal_PC) DPC=Enternal_PC
if (DPC==Mate_Internal_PC) DPC=Mate_External_PC
Here OPC is the original point code of the message, while DPC is the destination point code. The terms "External_PC" and "Internal_PC" refer to the point codes assigned to one of the two control units (say control unit 120a and 120b), while "Mate_External_PC" and "Mate_Internal_PC" refer to the other, redundant control unit (units 122a and 122b in this case).

In actual embodiments, processing of these external and internal point codes typically takes into account other network needs. For example, MTP management messages over the C-link among the control units should not have their OPC or DPC altered. Preferably, the message processing rules take into account the possibility of failure of one of the redundant control units, in which case a backup IP linkset is invoked to bypass the failed control unit. Further preferably, the message processing rules are also set up to deal with messages routed using Global Title Translation (GTT), as provided by the Signaling Connection Control Part (SCCP) of the SS7 protocols, in addition to messages conveyed by MTP layer 3 using point code links.

Media gateway units 128 convert standard pulse-code modulated (PCM) signals received from the MSC into data packets, and vice versa. Suitable media gateway units for this purpose are known in the art, such as the Cisco AS5300 gateway mentioned in the Background of the Invention or the Cisco AS5800 gateway. CPUs 126 serve as media gateway controllers for media gateway unit 128, by means of messages sent over LAN 132. They tell unit 128 which data from MSC 28 to packetize and where the packets are to be sent, and similarly how to encode media packets received over network 76 for conveyance back to the MSC. Communications between the control units and the media gateway unit are preferably in accordance with a standard protocol, such. as the Internet Engineering Task Force (IETF) Media Gateway Control Protocol (MGCP) or the ITU H.248 (MEGACO) protocol. These protocols, which are incorporated herein by reference, are described at www.ietf.org/internet-drafts/draft-huitema-MGCP-v0r1-01 and at www.ietf.org/internet-drafts/draft-ietf-megaco-protocol-08, respectively.

Details of how control units 120a,b and 122a,b handle cellular signaling protocols are described further hereinbelow.

Although FIG. 6 explicitly shows only gateways 74 and 78, the structure and functionality of other packet-switching gateways described herein for use at MSC sites, such as gateways 84 and 88 shown in FIGS. 3A, 3B and 4, are substantially identical to these. STP gateways 94 and 98 are also similar to gateways 74 and 78, except that the STP has no need of media gateway 128. Therefore, the STP gateways typically comprise only control units 120 and 122, together with router 130 and LAN 132 linking the components of the gateway. For large STPs, additional gateway units may be used.

A similar arrangement (with control units but no media gateway units) is suitable for use as a SMS gateway, in connection with SMS center 42. Such a gateway has the advantage of operating at the level of MTP protocol layer 3 and the SCCP layer (the network layers), as described further hereinbelow. As a result, the SMS messages are conveyed transparently over a single IP link, without the need for termination or tunneling.

Other types of data can be conveyed in a similar fashion, using gateways with control units but no media gateway units. Examples of such gateways, for data types that are known in the cellular art, include:

A Home Location Register (HLR) gateway.

A cellular third-generation (3G) Home Subscriber Service (HSS) gateway.

An Equipment Identity Register (EIR) gateway.

A Service Control Point (SCP) gateway.

Figure 7:
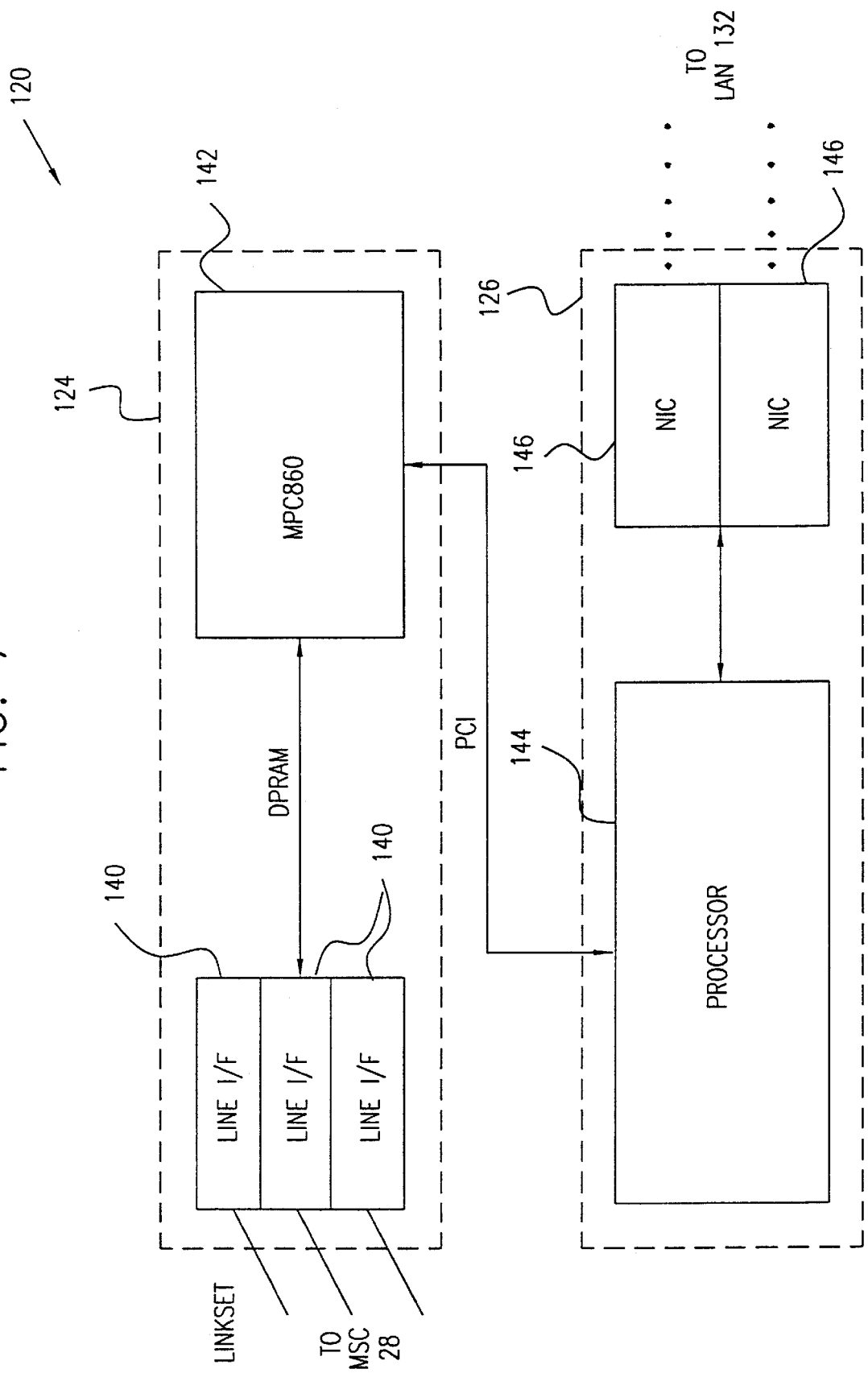
FIG. 7 is a block diagram that schematically illustrates further details of a signaling gateway unit used in the gateways of FIG. 6, in accordance with a preferred embodiment of the present invention.

FIG. 7 is a block diagram showing details of control unit 120, in accordance with a preferred embodiment of the present invention. The structure and the functionality of unit 120 described hereinbelow are equally applicable to unit 122. Interface unit 124 is seen to comprise line interfaces 140, which typically couple to the signaling outputs of MSC 28 via standard E1 links. A protocol processor 142 is responsible for MTP layer 1 and 2 processing. Preferably, unit 124 comprises an off-shelf device, such as the PMC 8260 processing card, produced by Force Computers GmbH, of Munich, Germany, or Radisys Corporation, of Hillsboro, Oreg. Processor 142 on this card preferably comprises a Motorola MPC 860 PowerQuicc processor, produced by Motorola, of Tempe, Ariz. Alternatively, unit 124 may comprise substantially any other suitable line interfaces and processor. Interface unit 124 and CPU 126 are preferable linked by a Compact PCI (cPCI) bus, as is known in the art.

CPU 126 preferably comprises a single board computer, including a microprocessor 144 and network interface devices (NICs) 146. Substantially any suitable single board computer may be used for this purpose, such as the PPC 680 board, produced by Force Computers, Munich, Germany. One of the NICs is preferably used for communication over LAN 132, including both signaling message packets, to be routed to network 76, and internal management packets, for such functions such as control of media gateway 128. As noted above, media gateway 128 is preferably controlled in accordance with the above-mentioned MGCP or MEGACO protocol, while other management functions are preferably carried out using a standard network protocol, such as the Simple Network Management Protocol (SNMP). The other NIC is responsible for protection interface 134 with the CPU of unit 122. Preferably, additional NICs (not shown in the figure) are provided for redundant back-up in case of a fault in one of NICs 146.

Figure 8:
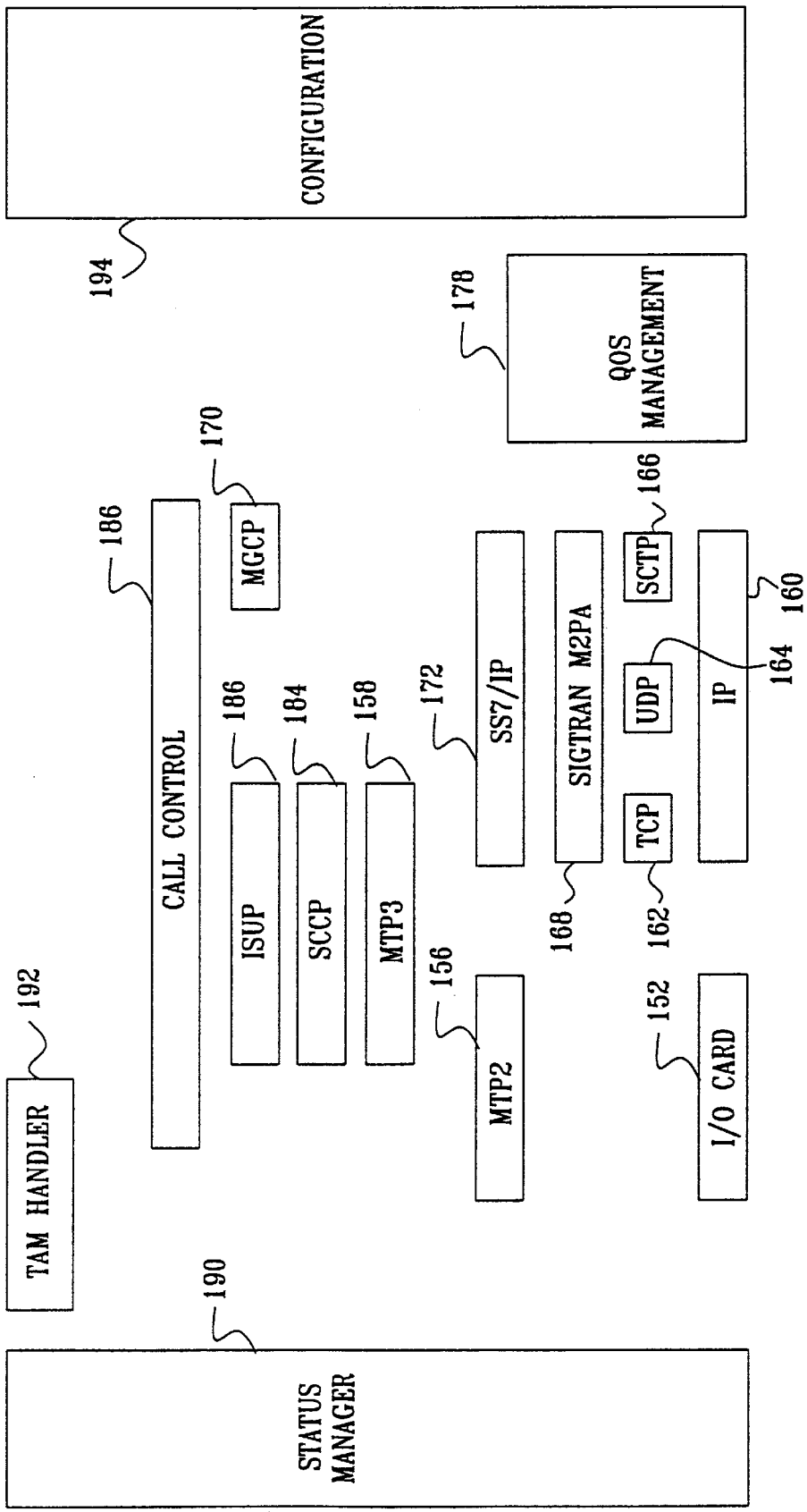
FIG. 8 is a block diagram that schematically illustrates software protocols used by the gateways of FIG. 6, in accordance with a preferred embodiment of the present invention.

FIG. 8 is a block diagram that schematically illustrates a software module structure 150 for software running on CPU 126, in accordance with a preferred embodiment of he present invention. Structure 150 is implemented both in MSC-site gateways, such as gateway 74, and in STP-site gateways, such as gateway 94 shown in FIG. 3A, as well as in stand-alone gateways, such as gateway 94 in FIG. 3B. Certain of the blocks in the structure, having to do with transmission of voice and other media, are omitted from the STP gateways. The omitted blocks include a media gateway control protocol (MGCP) module 170, a signaling monitor block 184, and a call control block 186. The functions of these blocks in the MSC gateway are described further hereinbelow.

MTP layers 1 and 2 of the SS7 protocols, for communications between gateway 74 and the MSC (or STP), are handled respectively by an I/O card module 152 and a MTP2 block 154. These blocks handle the full two first layers of SS7 signaling. A MTP3 bloc 156 and a SCCP block 158 handle the full MTP3 and SCCP functionalities of SS7. Suitable software for these blocks is available from various sources, such as Trillium Digital Systems, Inc. (Los Angeles, Calif.).

At a parallel level to MTP layers 1 and 2, packet communications are handled by an IP stack 160. A selection of different transport-layer protocols are used for "virtual MTP2 over IP" functions performed by the gateway. The transport-layer blocks include a Transport Control Protocol (TCP) block 162, a User Datagram Protocol block 164, and a Stream Control Transmission Protocol (SCTP) block 166. SCTP is a reliable transport protocol operating, designed to operate over a connectionless packet network such as IP. SCTP offers the following services to its users:

Acknowledged, error-free, non-duplicated transfer of user data.

Data fragmentation to conform to the maximum transmission unit (MTU) size of the discovered path.

sequenced deliver of user messages in multiple streams, with an option for order-of-arrival delivery of individual user messages.

Optional bundling of multiple user messages into a single SCTP packet.

Network-level fault tolerance through supporting of multi-homing at either or both ends of an association.

The design of SCTP includes appropriate congestion avoidance behavior and resistance to flooding and masquerade attacks. Further information regarding SCTP is available in a document identified as draft-ietf-sigtran-sctp-13.txt, available at www.ietf.org/internet-drafts. This document is incorporated herein by reference.

A SIGTRAN M2PA (SS7 MTP2-User Peer-to-Peer Adaptation) layer 168 is used to support seamless interaction of MTP3 protocol peers over the IP network connection. The M2PA layer supports management of SCTP transport associations and traffic in place of MTP2 Links. It also supports the MTP Level 2/MTP Level 3 interface boundary, with asynchronous reporting of status changes to management. Further information regarding SIGTRAN M2PA is available in a document identified as draft-george-sigtran-m2pa-02.txt, which is likewise available at the above-mentioned IETF Web site. This document is also incorporated herein by reference.

A SS7/IP block 172 handles the distribution of the MTP3 point code over IP network, as described above. As noted above, each integrated gateway, such as gateway 74, has two point codes: one External Point Code for interconnecting with SS7 network elements, such as MSC 28; and a novel Internal Point Code representing gateway 74 to other SS7/IP gateways, such as gateway 78. The main functions of block 172 are to make the appropriate changes in the Destination point Codes (DPC) and the Originating Point Codes (OPC), as expressed by the following formulas:

On the receiving side (message passed from SIGTRAN M2PA block 168 to MTP3 block 156), as described above-
if (DPC==Internal_PC) DPC=Enternal_PC
if (DPC==Mate_Internal_PC) DPC=Mate_External_PC On the transmitting side (message passed from the MTP3 block to the SIGTRAN M2PA block) if
if ((OPC==External_PC)&(DPC==IPlinkset_PC)) OPC=Internal_PC
if ((OPC==Mate_External_PC)&(DPC==IPlinkset_PC)) OPC=Mate_Internal_PC The transmitting side formulas include the condition "DPC==IPlinkset_PC" in order to avoid confusion in routing messages routed by SCCP block 184, as noted above.

Call setup s generally handled by signaling monitor block, 184, which deals mainly with SS7 ISDN User Part (ISUP) monitoring for those calls that are to be carried over IP network 76. When some calls involving the MSC are carried over the packet-switched network, and others are carried over PSTN 26 (as in the case of gateway 78, shown in FIGS. 2 and 4), block 184 handles only those calls that are carried over the packet-switched network. All other messages are routed to the appropriate destination over circuit-switched lines. Optionally, block 184 is adapted, additionally or alternatively, for IS41 monitoring or TUP Telephony User Part) monitoring or for substantially any other type of the call control or trunk maintenance signaling. Signaling associated with network handovers between MSCs are also handled by monitor 184.

Call control block 186 provides context support and port selection for each circuit identification code (CIC) in calls between one MSC and another. Preferably, there is a respective IP port associated with each CIC, enabling block 186 to determine the proper CIC or IP for each outgoing or incoming call that it handles. Block 186 keeps track of the context (state machine) of each call and controls the media gateway accordingly. Thus, application-level call control messages in the SS7 system are not terminated at gateway 74, as in signaling gateways known in the art, but rather are encapsulated and carried through the IP network to the destination MSC. Call control block 186 is also responsible for getting and handling all of the relevant call control-associated messages, such as ISUP, TUP, IS-41, etc.

The MSC thus has a virtual connection with all of the other MSCs and STPs in the system, as though it were communicating with. them directly over circuit-switched lines, rather than over IP network 76. The MSC maintains substantially the same linkset and SS7 signaling that it had before gateways 74 and 78 were introduced into the system, with the possible addition of the point codes of the "distributed STP" provided by the control gateways. If the control gateways are used instead of the regular STPs, however, as in the configuration of FIG. 3B, there are no new point codes in the network. Instead, the control gateways use the point codes of the dropped STPs. Thus, there is substantially no change needed in network architecture, planning or programming of the MSC. (Existing billing mechanisms in the cellular network are supported, as well.) As a result, n preferred embodiments CL the present invention, as shown particularly in FIG. 4, cellular network backbones are replaced by packet-switched network links.

Control units 120 and 122 use MGCP stack 170 to control media gateway 128. This stack is actuated whenever a call is set up through call control block 186 and monitor 184. Additionally or alternatively, stack 170 supports MEGACO, providing call control for the media gateway, as well as maintenance functions, as specified in the H.248 standard. Possible call control functions of stack 170 include, for example, call setup and teardown, continuity checking, treatment of transmission faults and fallback procedures. Maintenance functions typically include audit procedures, restarts, etc. Preferably, the control units use control information provided by ISUP monitor 184 in controlling the media gateway.

Other, general functions in structure 150 include a configuration manager 194, which is responsible for controlling and setting parameters in the other blocks. A Quality of Service (QoS) management block 178 sets packet priorities and performs other functions associated with different service levels offered by the network. Other modules, performing services that are known generally in the art, include a status manager 190, a telephony alarm module (TAM) handler 192 and an initialization module 196.

While preferred embodiments are described herein with reference to particular cellular systems and standards, it will be apparent to those skilled in the art that the principles of the present invention, such as the convergence of signaling and media and methods provided for achieving this convergence, are similarly applicable to other mobile communication systems. Such systems include particularly Personal Communication Services (PCS) systems and Third Generation (3G) cellular systems, as well as wireless and wired networks of other types. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. Gateway apparatus for coupling a cellular switching center to a packet-switched network, comprising:
   a control unit, adapted to receive upstream signaling messages from the cellular switching center destined for a cellular signaling transfer point and to packetize the upstream signaling-messages for transmission over the packet-switched network; and
   a media gateway unit, adapted to receive from the cellular switching center upstream media data and to packetize the media data for transmission over the packet-switched network wherein the control unit is configured to emulate circuit-switched signaling communications between the cellular switching center and other elements of a cellular network
   wherein the control unit is configured to emulate circuit-switched signaling, communications between the cellular switching center and other elements of a cellular network, and
   wherein the cellular switching center comprises a mobile switching center (MSC), and
   wherein the control unit is configured to emulate the signaling communications between the MSC and the signaling transfer point in the cellular network, and
   wherein the control unit is adapted to select for packetizing certain of the signaling messages that are to be transmitted over the packet-switched network, while other signaling messages are transmitted by the control unit over a circuit-switched link.

2. Cellular communications apparatus, comprising:

a plurality of cellular network switches, each switch adapted to transmit and receive signaling messages and media data; and a plurality of gateways, at least one such gateway associated with each of the plurality of network switches and coupled to receive the signaling messages transmitted by the associated switch and to convey the messages over a common communication link to another of the gateways associated with another one of the network switches, wherein the cellular network switches are configured to communicate, in the absence of the gateways, over connections in a circuit-switched network, and wherein the gateways are configured to emulate circuit-switched communications with the associated cellular network switches, wherein the gateways share a common address in the circuit-switched network.

3. Cellular communications apparatus, comprising:

a plurality of cellular network switches, each switch adapted to transmit and receive signaling messages and media data; and a plurality of gateways, at least one such gateway associated with each of the plurality of network switches and coupled to receive the signaling messages transmitted by the associated switch and to convey the messages over a common communication link to another of the gateways associated with another one of the network switches, wherein the cellular network switches comprise at least one mobile switching center (MSC), and wherein the gateway associated with the at least one MSC is adapted to select certain of the signaling messages and media data to be conveyed over the common link, while other signaling messages and media data are transmitted by the MSC over separate circuit-switched links.

4. A method for coupling cellular switching equipment to a packet-switched network, comprising:

receiving upstream signaling messages and upstream media data from the cellular switching equipment; and packetizing the upstream signaling messages and the upstream media data for transmission over a common link in the packet-switched network, wherein receiving the signaling messages and the media data comprises mimicking circuit-switched signaling communications between the cellular switching equipment and other elements of a cellular network, and wherein the cellular switching equipment comprises a mobile switching center (MSC), and wherein mimicking the circuit-switched signaling communications comprises mimicking signaling communications between the MSC and a signaling transfer point (STP) in the cellular network, and wherein packetizing the messages comprises sending the messages over the packet-switched network from a first packet gateway to a second packet gateway, both gateways having a common point code in the cellular network.

5. A method for coupling cellular switching equipment to a packet-switched network, comprising:

receiving upstream signaling messages and upstream media data from the cellular switching equipment; and packetizing the messages and the data for transmission over a common link in the packet-switched network, wherein receiving the signaling messages and the media data comprises mimicking circuit-switched signaling communications between the cellular switching equipment and other elements of a cellular network, and wherein the cellular switching equipment comprises a mobile switching center (MSC), and wherein mimicking the circuit-switched signaling communications comprises mimicking signaling communications between the MSC and a signaling transfer point (STP) in the cellular network, and wherein packetizing the messages and the data comprises selecting for packetizing certain of the signaling messages that are to be transmitted over the packet-switched network, while other signaling messages are transmitted by the cellular switching equipment over a circuit-switched link.

* * * * *